United States Patent [19]

Sun

[11] Patent Number: 5,955,538
[45] Date of Patent: Sep. 21, 1999

[54] PROCESS FOR THE MANUFACTURE OF ETHYLENE/VINYL ACETATE/VINYL ALCOHOL TERPOLYMER

[75] Inventor: Yi-Jun Sun, Brampton, Canada

[73] Assignee: AT Plastics Inc., Ontario, Canada

[21] Appl. No.: 09/025,697

[22] Filed: Feb. 18, 1998

[51] Int. Cl.[6] ............................. C08F 16/02; C08F 4/16; C08F 8/12

[52] U.S. Cl. ............................ 525/62; 525/61; 525/57; 525/56; 525/370

[58] Field of Search ............................ 525/56, 57, 61, 525/62, 370

[56] References Cited

U.S. PATENT DOCUMENTS 4,003,810  1/1977  Hoyt et al. ........................... 526/8

FOREIGN PATENT DOCUMENTS 2 567 894  7/1984  France ..................... C08F 8/12
55-5942    1/1980  Japan ...................... C08F 8/12

OTHER PUBLICATIONS

Hesse et al, J.M.S.—Pure Appl. Chem., A31(10), pp. 1425–1445 (1994).
Kim et al, J. of Applied Polymer Sci., vol. 54, 33–45 (1994).

*Primary Examiner*—James J. Seidleck
*Assistant Examiner*—Olga Asinovsky
*Attorney, Agent, or Firm*—Pillsbury Madison & Sutro, LLP

[57] ABSTRACT

A process for the manufacture of ethylene/vinyl acetate/vinyl alcohol terpolyrners of improved color. The process comprises reacting ethylene/vinyl acetate copolymer with a hydroxyl-containing compound in the presence of a catalyst. The hydroxyl-containing compound is a primary aliphatic alcohol. The catalyst is 1,3-diacetoxy-1,1,3,3-tetrabutyldistannoxane.

13 Claims, No Drawings

PROCESS FOR THE MANUFACTURE OF ETHYLENE/VINYL ACETATE/VINYL ALCOHOL TERPOLYMER

The present invention relates to a process for the manufacture of ethylene/vinyl acetate/vinyl alcohol terpolymers, which may be referred to herein as EVA(OH) terpolymer, in a process involving the reaction of ethylene/vinyl acetate (EVA) copolymer with a hydroxyl compound in the presence of a catalyst. In particular, the process of the invention relates to such a process in which EVA(OH) of improved colour is obtained.

Ethylene/vinyl acetate/vinyl alcohol terpolymers are used in a wide variety of applications, including as adhesives, barrier films, fusible interlinings and the like.

Processes for the reaction of EVA with hydroxyl compounds to form EVA(OH) may be operated in a variety of ways, including in the form of a hydrolysis process in which ethylene/vinyl acetate (EVA) is treated in the presence of a catalyst and a hydroxyl-containing compound to convert the vinyl acetate groups of the EVA copolymer to vinyl alcohol groups. Such a process may be represented by the following equation:

where the ROH represents an alcohol and $CH_3COOR$ is the related low molecular weight ester of acetic acid that is formed as a reaction product. When a base is used as the catalyst, this process may also be referred to as saponification of EVA.

Saponification of EVA may be carried out with the EVA either in a solid or a molten state. In the former, pellets of EVA are reacted with alcohol in the presence of a strong base as catalyst and an ether as a swelling agent, as disclosed in Japanese Patent No. 55-5942 of Toyo Soda Kogyo K. K., published Jan. 17, 1980. In this process, the reaction is conducted on EVA pellets at a relatively low temperature, which is below the melting point of EVA, and using a long residence time e.g. several hours, in the reactor.

Another method of saponification is to carry out the reaction using an extrusion process, in which the EVA is in a molten state and the reaction time is limited to several minutes. An efficient catalyst is required for such an extrusion process to achieve a high degree of conversion of vinyl acetate groups to the corresponding vinyl alcohol groups during the short residence time in the extruder. A strong base may be used as such a catalyst, but strong bases tend to be corrosive on the apparatus used in the process. Furthermore, the use of a strong base as catalyst tends to cause a problem of discolouration of the EVA(OH) product that is obtained. Consequently, the product obtained may not be suitable for some applications.

A number of tin compounds have also been used as an active catalyst for the hydrolysis of EVA. However, the tin compound that is conventionally used viz. dibutyltin dilaurate (DBTDL) has a low reactivity, resulting in a relatively low degree of conversion of the vinyl acetate groups to vinyl alcohol groups during the extrusion process.

In an example of a conventional extrusion process for making EVA(OH), A. Bouillaux et al. disclosed the use of DBTDL as catalyst in a reaction with molten EVA in a batch mixer, in French Patent No. 2 567 894, published Jan. 24, 1986. The patent discloses a comparison of the reactivity of DBTDL with that of an organic alkali catalyst viz. sodium methoxide (MeONa). With the use of DBTDL in an amount of 3 parts per 100 parts of polymer, in the presence of 21.2 parts per 100 parts of polymer of 1-octanol, the conversion of the vinyl acetate groups to vinyl alcohol groups was 62% at 170° C. and a reaction time of 50 minutes. When the MeONa was used as catalyst under the same reaction conditions, the conversion was 72%.

A. Hesse et al. disclosed the use of a twin screw extruder as reactor, with MeONa as catalyst, in Pure Applied Chemistry, A31(10), pp. 1425–1445, 1994. It was shown that MeONa was an efficient catalyst and that the equilibrium of the reaction could be achieved during the extrusion process. However, P. J. Kim et al. in Journal of Applied Polymer Science, Vol.54, pp.33–45, 1994, disclosed that the use of a conventional tin compound i.e. DBTDL, resulted in a moderate degree of conversion of the vinyl acetate groups to the vinyl alcohol groups, being from 19 to 32% at 170° C. when the mean residence time was 3–6 minutes.

The long reaction time required as a consequence of the low reactivity of DBTDL as catalyst makes use of such a catalyst as being commercially undesirable in the manufacture of EVA(OH) in a reactive extrusion process, especially when a high conversion of the vinyl acetate groups to vinyl alcohol groups is needed.

In tests of the use of organic alkali as a catalyst, it has been found that a problem of discolouration of the product occurred when MeONa was used as a catalyst at a temperature of greater than 100° C. Moreover, the colour of product could not be removed through the use of a purification process, as disclosed below.

The use of a more efficient catalyst in the manufacture of EVA(OH) on an industrial scale would be beneficial, especially if use of such a catalyst eliminated or reduced discolouration of the EVA(OH) product that was obtained.

A process for the manufacture of ethylene/vinyl acetate/vinyl alcohol terpolymers using a highly reactive tin compound, and especially using a reactive extrusion process, to yield a product of improved colour has now been found.

Accordingly, an aspect of the present invention provides a process for the manufacture of ethylene/vinyl acetate/vinyl alcohol terpolymers comprising reacting ethylene/vinyl acetate copolymer with a hydroxyl-containing compound in the presence of a catalyst, said hydroxyl-containing compound being at least one primary aliphatic alcohol and said catalyst being 1,3-diacetoxy-1,1,3,3-tetrabutyldistannoxane.

In embodiments of the present invention, the process is a solid state process or a melt phase process, especially a melt extrusion process.

In further embodiments, the process is a continuous process or a batch process.

The present invention relates to a process for the manufacture of ethylene/vinyl acetate/vinyl alcohol terpolymers from ethylene/vinyl acetate copolymers, in the presence of 1,3-diacetoxy-1,1,3,3-tetrabutyldistannoxane (DATBS) as catalyst.

In preferred embodiments of the present invention, the process is operated as an extrusion process, and especially as an extrusion process of the type known as a reactive extrusion process. As is illustrated hereinafter in the examples, EVA(OH) terpolymer that is obtainable in the process has the same or substantially the same colour (whiteness) as that of the EVA copolymer that was fed to the process.

A high degree of conversion of the vinyl acetate groups of the EVA to vinyl alcohol groups in a reactive extrusion process may be achieved using the normal residence time of a polymer in such an extrusion process e.g. in a period of about 3–8 minutes. However, it is to be understood that the degree of conversion of the vinyl acetate may be controlled by selecting the composition fed to the extruder and the parameters of extrusion in the reactive extrusion process. For example, the characteristics of the EVA, including vinyl acetate content, the amount of catalyst, the amount and type of hydroxyl compound, the temperatures and residence time may be varied in control of the degree of conversion.

The EVA copolymer that is used in the process of the invention may have a wide range of vinyl acetate content. For example, the vinyl acetate content may be in the range of about 1–50% by weight vinyl acetate. Similarly, the melt index of the EVA copolymer may be of a wide range e.g. a range of 0.1 to 800 g/10 min. Melt index is measured at 190° C. using a weight of 2.16 kg, according to the method of ASTM D-1238-94a.

The ethylene/vinyl acetate copolymer is fed to the reactor with at least one, and usually only one, hydroxyl-containing compound that is selected from the primary aliphatic alcohols, the number of carbon atoms in such alcohols being in the range of 1–16. Examples of the alcohols include methanol, ethanol, 1-propanol, 1-butanol, 1-hexanol, 1-octanol, 1-decanol and 1-dodecanol. The preferred alcohols are low molecular weight primary alcohols e.g. methanol and 1-propanol.

The catalyst used in the process of the present invention is 1,3-diacetoxy-1,1,3,3-tetrabutyldistannoxane (DATBS). The amount of catalyst that is used in the process of the invention may be varied over a wide range, for example from about 0.1% to about 10% by weight, based on the weight of the EVA copolymer. In embodiments, the DATBS is fed to the process in the form of a solution in inert hydrocarbon solvent e.g. naphtha, especially if the process is operated in an extruder.

The composition of EVA copolymer, hydroxyl-containing compound and catalyst fed to the process of the invention may be varied over a wide range, depending on the particular product that is to be manufactured. For instance, the composition and reaction conditions may be varied such that a wide range of conversion of vinyl acetate to vinyl alcohol in the EVA copolymer is achieved e.g. a conversion in the range of 1–70%. In preferred embodiments of the process, the conversion is in the range of 20–70%.

In preferred embodiments of the invention, the process is conducted in an extruder in which EVA copolymer in pellet form is fed into the extruder, together with a mixture of alcohol and DATBS that is used as the catalyst. The pellets would normally be fed to the extruder through a hopper, but the mixture of the alcohol and catalyst would normally be injected into molten EVA polymer in the extruder through an injection port. The rate of feeding of EVA and the injection rate of the mixture of catalyst with alcohol may be controlled in order to obtain the required chemical composition for the reaction. The parameters of the extrusion process, such as the rate of rotation of the screw and the barrel temperature profile in the apparatus may be controlled. Such parameters affect the reaction of the EVA copolymer to form EVA(OH) terpolymer. In particular, temperature and residence time in the extruder affect the efficiency of the process. In preferred embodiments of the invention, the melt temperature is in the range of 150–220° C. and especially in the range of 180–205° C., and the residence time of the polymer in the extruder is in the range of 2–30 minutes, especially 4–8 minutes.

After extrusion, the EVA(OH) product that is obtained is pelletized, and then preferably washed for removal of residual alcohol, catalyst and the low molecular weight ester that is the by-product of the reaction process. In a washing step, the pellets of EVA(OH) may be washed at room temperature e.g. for a period of about 8–12 hours, with a mixture of water and an ether having 1–10 carbon atoms. An example of such an ether is tetrahydrofuran (THF).

As exemplified hereinafter, the EVA(OH) that may be obtained in the process retains transparency and colour properties of EVA, and does not exhibit discolouration.

The present invention is illustrated by the following examples. In the examples, in order to obtain an analysis of the conversion of vinyl acetate, the EVA(OH) product was purified by dissolving in tetrahydrofuran (THF) and subsequently precipitated in methanol. The purified sample was then dried in a vacuum oven at 40° C. for 12 hours. The purified and dried EVA(OH) obtained was pressed into a film having a thickness of 150 pm, which was then analyzed by FTIR (Fourier Transform Infrared). The FTIR was calibrated in the region of 3200 to 3700 cm$^{-1}$, which represents the infrared absorption range of hydroxyl groups. The absorption at 2020 cm$^{-1}$ was taken as an internal reference in quantitative analysis.

EXAMPLE I

An EVA copolymer, ATEVA™ 2830M from AT Plastics, containing 28% by weight vinyl acetate and having a melt index (MI) of 150 g/10 min., was fed to an extruder. 1-Propanol (purity 99%) was used as the hydroxyl-containing compound (reactant). DATBS was used in the form of a 50% solution in naphtha.

The extruder was a Berstorff ZE-40 co-rotating intermeshing twin screw extruder, with an injection system but without a degassing system. A Gala pelletiser was connected on the die of the extruder for pelletising the product.

The EVA pellets were fed into the extruder at: a rate of 8.5 kg/hr. A mixture of 1-propanol (86.7% by weight in the mixture) and DATBS/Naphtha solution (13.3% by weight in the mixture) was injected into the extruder at a rate of 32 g/min. These feeding and injection rates gave a ratio (R) of hydroxy (OH) group/VA of 1.0 mole/mole, and a concentration of DATBS of 1.5 g/100 grams of EVA resin (i.e. 1.5 parts/hundred parts of resin (phr) in EVA copolymer) or 4.6 g DATBS/mole of VA.

The temperature of the melt was 197° C. during the extrusion, and the screw rotating speed was 100 rpm.

The EVA(OH) obtained was pelletised under water, then dried with hot air. The EVA(OH) pellets had the same colour as the EVA, and had a strong odour of alcohol.

1.2 grams of EVA(OH) pellets were dissolved in 40 grams of boiling tetrahydrofuran (THF), and then precipitated in 300 grams of methanol. The sample was dried in a vacuum at 40° C. for 12 hours. The degree of conversion of VA was 38.2%.

EXAMPLE II

The procedure of Example I was repeated, except that an EVA copolymer of ATEVATM 2820M, containing 28% by weight of vinyl acetate and having a MI of 25 g/10 min, was used as the initial EVA resin. The mean residence time of extrusion was 4–5 minutes. The temperature of the polymer melt was 197° C.

The EVA(OH) product was in natural colour, and the VA conversion was 42.1%.

EXAMPLE III

The procedure of Example II was repeated, except that extrusion temperature parameters were adjusted to provide a polymer melt temperature of 164° C., and a mean residence time of polymer melt in extruder of 5–6 minutes.

The EVA(OH) product was of natural colour, and VA conversion was 39.4%.

50 grams of EVA(OH) pellets were washed with a mixture of 250 ml water and 500 ml THF at room temperature (25°

C.) for 12 hours. During the washing process, the EVA(OH) pellets were swollen by the solvent. Washed pellets were dried in vacuum at 40° C. for 24 hours. The washed pellets were odourless and in natural colour. The degree of conversion of VA in the washed EVA(OH) pellets was 39.0%.

The measurement of discoloration on purified EVA(OH) obtained from this example is shown in Table 1.

EXAMPLE IV

The procedure of Example I was repeated, except that an EVA copolymer of ATEVA™ 2803M (containing 28% by weight vinyl acetate and having a MI of 3 g/10 min.) was used as initial EVA resin. The temperature of the polymer melt in the extruder was 200° C.

The EVA(OH) product was in natural colour, and VA conversion was 64.1%.

EXAMPLE V

The procedure of Example I was repeated. An EVA copolymer of ATEVA™ 1235M (containing 12% by weight vinyl acetate and having a MI of 5.5 g/10 min.) was used as initial EVA resin.

The EVA pellets were fed into the extruder at a rate of 8.0 kg/hr. A mixture of 1-propanol (86.7% by weight in the mixture) and DATBS/naphtha solution (13.3% by weight in the mixture) was injected into the extruder at a rate of 12.9 g/min. These feeding and injection rates gave a ratio (R) of hydroxy (OH) group/VA of 1.0 mole/mole, and a concentration of DATBS of 0.65 phr in the EVA copolymer, or 4.6 g DATBS/mole of VA. The temperature of the polymer melt in the extruder was 205° C.

The EVA(OH) product was in natural colour, and VA conversion was 32.6%.

EXAMPLE VI

The procedure of Example II was repeated, except that methanol was used as the reactant alcohol. The polymer melt temperature in the extruder was 196° C.

The EVA(OH) product was in natural colour, and VA conversion was 59.9%.

EXAMPLE VII

The procedure of Example II was repeated, except that DATBS in the form of a powder (purity 97%) was used as catalyst. The DATBS powder was dissolved in 1-propanol at room temperature, then injected into the extruder. The initial chemical composition was: R=1.0 mole/mole, and the concentration of DATBS was 1.5 phr in EVA copolymer (4.6 g/mole VA). The polymer melt temperature in the extruder was 191° C.

The EVA(OH) product was in natural colour, and VA conversion was 23.8%.

EXAMPLE VIII

In a comparative experiment, the procedure of extrusion in Example III was repeated. The EVA copolymer of ATEVA™ 2820M was used as initial EVA resin. 1-Propanol was used as alcohol reactant, and MeONa (sodium methoxide) was used as catalyst (instead of DATBS).

The EVA pellets were fed into the extruder at a rate of 13.0 kg/hr. A mixture of 1-propanol and MeONa was injected into the extruder. The initial chemical composition was: R=0.6 mole/mole, and the concentration of MeONa was 0.8 phr in EVA copolymer (2.5 g/mole VA). The polymer melt temperature in the extruder was 154° C.

The EVA(OH) product was yellow in colour, and the VA conversion was 76.0%. The yellow colour of EVA(OH) product cannot be removed by purification involving dissolving in THF and precipitation in methanol, or by dissolving in toluene and precipitation in acetone, or by the THF/water wash disclosed above. The measurement of discoloration on purified EVA(OH) obtained from this example is shown in Table 1.

EXAMPLE IX

The procedure of Example II was repeated, except that the conventional catalyst DBTDL (purity 99%) was used. The initial chemical composition was: R=1.0 mole/mole, and the concentration of DBTDL was 1.5 phr in EVA copolymer. The mean residence time of polymer melt in extruder was measured to be 4–5 minutes. The temperature of polymer melt in the extruder was 196° C.

The EVA(OH) product was in natural colour, but VA conversion was 22.1%.

EXAMPLE X

The procedure of Example IV was repeated, except that the conventional catalyst DBTDL (purity 99%) was used. The initial chemical composition was: R=1.0 mole/mole, and the concentration of DBTDL was 1.5 phr in EVA copolymer. The temperature of polymer melt in the extruder was 204° C.

The EVA(OH) product was in natural colour, but VA conversion was 28.2%.

EXAMPLE XI

To illustrate the effect of processes for the manufacture of EVA(OH) on the colour of the product obtained, the yellowness of EVA(OH) was measured using a Sphere Spectrophotometer (X-Rite® SP68), according to the procedure of ASTM D1925-70. ATEVA™ 2820M ethylene/vinyl acetate polymer was used as standard material for comparing the colour. The same polymer was used in the process of Example III and the process of comparative Example VIII.

Films with a thickness of 270 μm were prepared and used for the measurements.

The data of yellowness measurement are shown below in Table 1.

TABLE 1

Measurement of Yellowness

|  | L* | a* | b* | ΔYI |
|---|---|---|---|---|
| EVA | 92.32 | 0.37 | 0.66 | 0 |
| EVA(OH) of Example III | 92.39 | 0.38 | 0.68 | 1.50 |
| EVA(OH) of Example VIII | 91.14 | −1.70 | 7.85 | 12.85 |

Note:
L* is the indice of lightness of the sample, 100 is white (or fully transparent), −100 is black.
a* is the indice of green/red colour, −10 is saturated green, 10 is saturated red.
b* is the indice of blue/yellow, −10 is saturated blue, 10 is satureated yellow.
ΔYI is the difference in yellowness, taking ATEVA ™ 2820M as standard material.

This example shows that the yellowness of the EVA(OH) of the method of the invention illustrated in Example III increased slightly, by 1.50 units, compared with the EVA polymer fed to the process. In contrast, the EVA(OH) of the comparative method of Example VIII showed an increase in yellowness of 12.85 units. The parameter "b" indicates the high level of yellowness that was obtained.

Claims:

1. A process for the manufacture of ethylene/vinyl acetate/vinyl alcohol terpolymers comprising reacting ethylene/vinyl acetate copolymer with a hydroxyl-containing compound in the presence of a catalyst, said hydroxyl-containing compound being at least one primary aliphatic alcohol having 1–16 carbon atoms and said catalyst being 1,3-diacetoxy-1,1,3,3-tetrabutyldistannoxane.

2. The process of claim 1 in which the process is a reactive extrusion process.

3. The process of claim 1 in which the process is operated in the melt phase.

4. The process of claim 3 in which the process is operated in an extruder.

5. The process of claim 3 in the form of a batch process.

6. The process of claim 3 in the form of a continuous process.

7. The process of claim 3 in which the ethylene/vinyl acetate copolymer is reacted with one primary aliphatic alcohol.

8. The process of claim 7 in which the primary aliphatic alcohol is selected from the group consisting of methanol, ethanol, 1-propanol, 1-butanol, 1-hexanol, 1-octanol, 1-decanol and 1-dodecanol.

9. The process of claim 1 in which the ethylene/vinyl acetate copolymer has 1–50% by weight of vinyl acetate and a melt index in the range of 0.1–800 g/10 min.

10. The process of claim 9 in which the amount of catalyst is 0.1–10% by weight, based on the weight of the ethylene/vinyl acetate copolymer.

11. The process of claim 1 in which the ethylene/vinyl acetate/vinyl alcohol terpolymer is washed to remove residual alcohol, catalyst and reaction by-products.

12. The process of claim 1 in which the 1,3-diacetoxy-1,1,3,3-tetrabutyldistannoxane is fed to the process in the form of a solution in inert hydrocarbon solvent.

13. The process of claim 12 in which the solvent is naphtha.

* * * * *